March 9, 1937.  H. A. LOHSE  2,073,214
AUTOMATIC CLUTCH FOR MOTOR VEHICLES
Filed May 11, 1935  3 Sheets-Sheet 1

Inventor

Hasell A. Lohse

By *Clarence A. O'Brien*
Attorney

March 9, 1937.   H. A. LOHSE   2,073,214
AUTOMATIC CLUTCH FOR MOTOR VEHICLES
Filed May 11, 1935   3 Sheets-Sheet 2

Inventor
Hasell A. Lohse
By *Clarence A. O'Brien*
Attorney

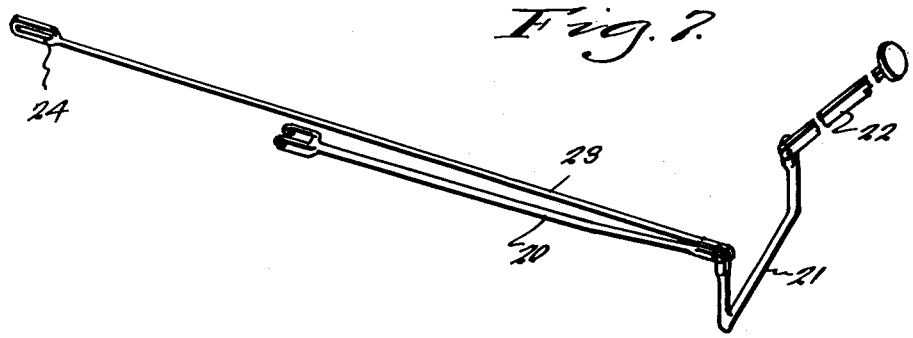
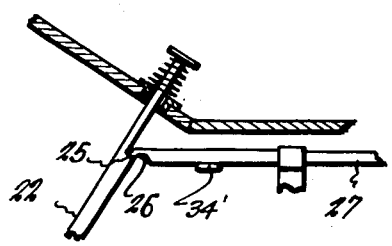
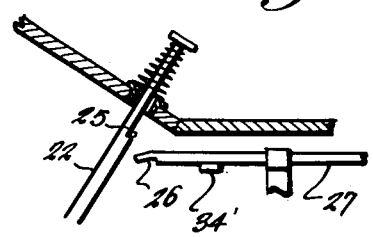
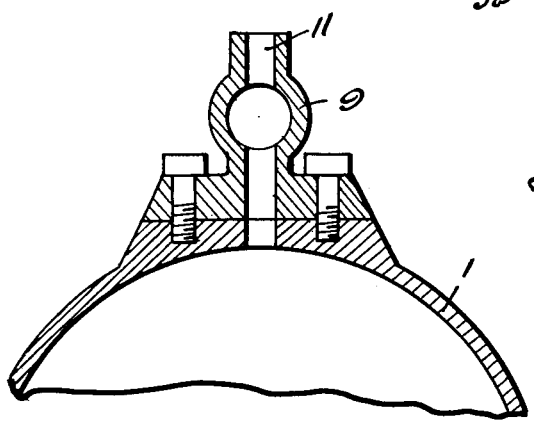
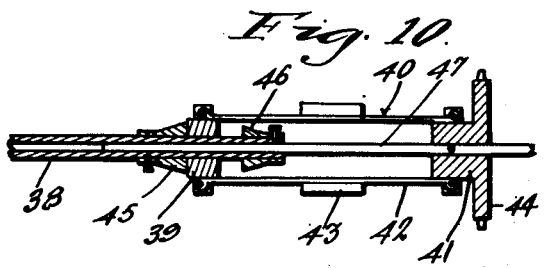
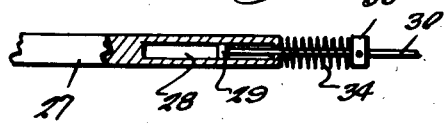
Inventor
Hasell A. Lohse Patented Mar. 9, 1937

2,073,214

UNITED STATES PATENT OFFICE 2,073,214

AUTOMATIC CLUTCH FOR MOTOR VEHICLES

Hasell A. Lohse, North Wildwood, N. J.

Application May 11, 1935, Serial No. 21,065

3 Claims. (Cl. 192—.01)

This invention relates to an automatic clutch for motor vehicles, the general object of the invention being to provide means actuated by the suction of the motor and controlled by the accelerator for automatically operating the clutch, with governor control means for preventing the clutch from being disengaged, when the vehicle is in high gear, and the accelerator is released, unless the car is slowed to a low speed and then the governor automatically disengages the clutch.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 6 is a similar view showing the parts in a different position.

Figure 7 is a view showing how the accelerator link and the link connected to the suction operated device are connected with the accelerator.

Figure 8 is a sectional elevational view showing how the rod engages the accelerator to hold the same in partly lowered position.

Figure 9 is a similar view but showing the parts separated.

Figure 10 is a sectional view through the governor means.

Figure 11 is a fragmentary transverse sectional view on the line 11—11 of Figure 2.

Figure 1:
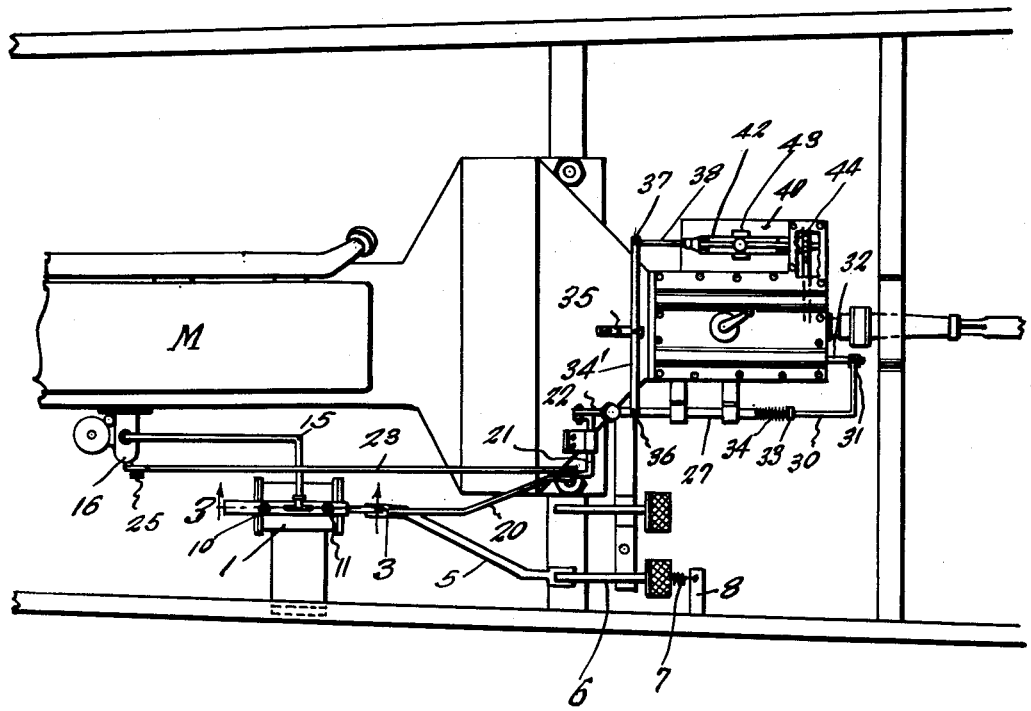
Figure 1 is a fragmentary top plan view of the chassis of a motor vehicle and parts of the power plant showing the invention applied thereto.
Figure 2:
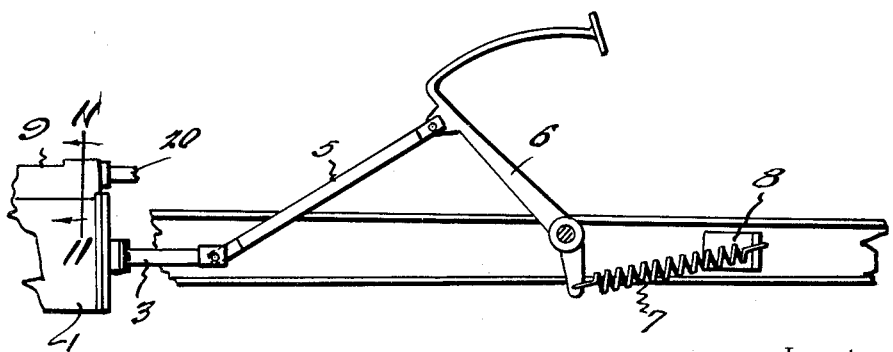
Figure 2 is a fragmentary elevation showing the clutch pedal when it is connected to the vacuum actuated piston of a cylinder.

In these drawings the numeral 1 indicates a cylinder suitably supported from the chassis of the motor vehicle and the numeral 2 indicates a piston located in the cylinder and having a rod 3 connected therewith which passes through a packing gland 4 in the rear end of the cylinder. The other end of this rod is connected by a link 5 with the clutch pedal 6, a depending part of which is connected to one end of a spring 7, the other end of which is connected to bracket 8 on a part of the chassis.

Figure 4:
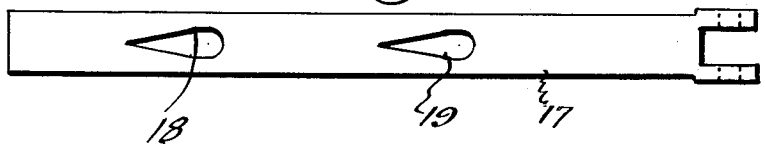
Figure 4 is a top plan view of the slide bar.

A chest 9 is mounted on the cylinder and is provided with the front and rear vent ports 10 and 11 and the substantially L-shaped passages 12 and 13 which have their inner ends in communication with the lower parts of the passages 10 and 11 and the upper ends in connection with a manifold 14 which is connected by a conduit 15 with the intake manifold 16 of the motor M so that a suction or vacuum will be produced in the manifold 14 when the engine or motor is in operation. The four passages are controlled by a slide valve 17 which is formed with the openings 18 and 19 each of which has a wide rear end and tapers to a point at its front end as shown in Figure 4. This valve is connected by a link 20 to one limb of a substantially U-shaped rock shaft 21, the accelerator 22 being hinged to the other limb as shown more particularly in Figure 7. A link 23 is pivoted to the first limb of the shaft 21 and has a longitudinally extending slot 24 in its other end which receives the arm 25 of the throttle valve of the carburetor.

Figure 5:
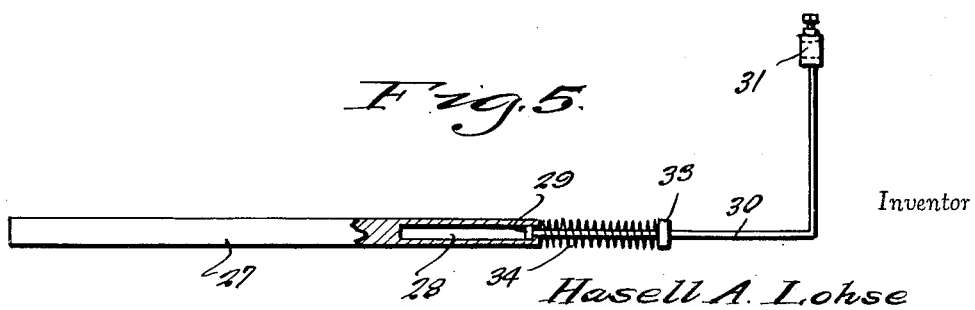
Figure 5 is an elevation partly in section and showing the sliding connection between the governor actuated rod and the rod operated by the high gear fork.

The accelerator 22 is formed with a shoulder forming notch 25 which is adapted to be engaged by a projection 26 on a slide rod 27. The rear end of this rod has a bore 28 therein which slidingly receives the head 29 of an angle bar 30 which is connected at 31 to the high gear fork rod 32 of the transmission. The bar 30 has a collar 33 thereon and a spring 34 encircling a part of the bar and has one end bearing against the collar 33 and the other end against the rod 27 and this spring tends to hold the head 29 in the outer end of the bore 28 as shown in Figure 5 and to permit the parts to move toward each other as shown in Figure 6.

A transverse lever 34' is pivoted at its center to a bracket 35 and one end of this lever is pivoted as at 36 to the bar 27 and its other end is pivoted as at 37 to a rod 38 which passes slidably through the movable end member 39 of a governor 40 which is suitably supported at one side of the transmission as shown in Figure 1. The stationary member is shown at 41 and the spring arms at 42, these arms being pivoted to the members 39 and 41 and have the weights 43 attached thereto. While the member 41 is held against sliding movement it is supported for rotary movement and is driven by gears or the like, shown at 44 from the transmission. An outer stop 45 is attached to the member 38 and an inner stop 46 is attached to the member, these stops being located one on each side of the member 39 of the governor. The shaft 47 of the governor is attached to the member 41 and extends into a bore in the member 38 as shown in Figure 10. The stop 46 simply acts as means for limiting outward swinging movement of the governor arms, the stop 45 being the effective stop for moving the bar 27 to a position to free it from the shoulder 25 of the accelerator as the speed of the engine is reduced.

Figure 3:
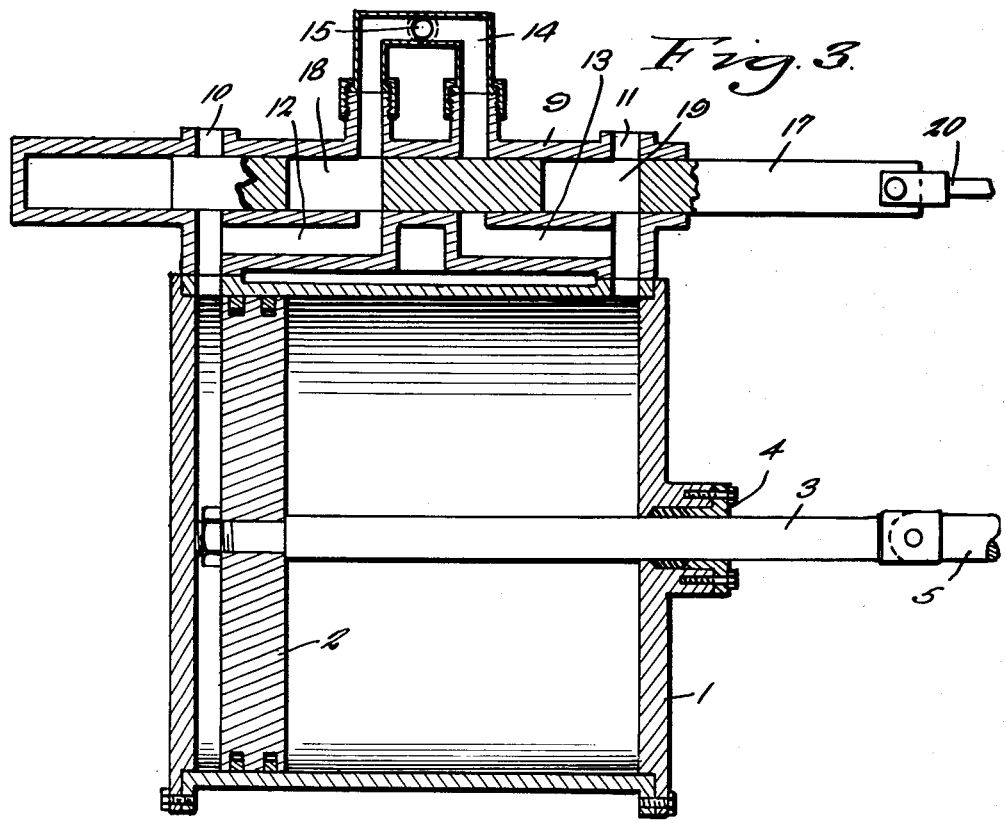
Figure 3 is a section on the line 3—3 of Figure 1.

The slot 24 in the link 23 which is connected to the accelerator and the throttle valve will permit the slide valve 17 to be actuated before the throttle valve is open and I prefer to make this slot of such a length that the accelerator would have to be pressed down about 1 and ¼ inches before it would start to open the butterfly valve. When the accelerator is fully released, the slide valve 17 will be in a position to open the passage 12 and the passage 11 and to close the passages 10 and 13 as shown in Figure 3. This makes a direct vacuum passage from the manifold of the engine to the cylinder ahead of the piston so that the piston 2 is drawn to a forward position, as shown in Figure 3 and this causes the link 5 to disengage the clutch. As will be seen the spring 7 tends to disengage the clutch and the tension of this spring should be just a little short of equalizing the tension of the springs in the clutch. This will make it easy for the piston to move the clutch pedal in and out for engaging and disengaging the clutch at a rapid rate of speed. The clutch can be constructed with very light springs and in some cases the springs could be eliminated for when the clutch is in an engaged position there will be a vacuum in the cylinder chamber holding the piston with the clutch very tightly in its engaged position.

Now, as the accelerator is depressed, the slide valve 17 moves forwardly closing the passage 12 and rear vent passage 11 and after the valve has moved forwardly approximately one-fourth of an inch both passages 12 and 11 will be closed. The valve now has to move approximately a fraction over one-fourth of an inch forwardly before the ports or openings 18 and 19 start to open the passages 10 and 13. As these passages open the suction from the engine moves the piston to the other position to engage the clutch.

By having the ports or openings 18 and 19 of the shape shown in Figure 4 the driver can better control the engagement of the clutch and the approximate quarter of an inch movement of the valve where its ports do not come in contact with the ports or passages of the valve chest is to give the driver still better control of the clutch. If the valve ports moved right from one set of passages to the other without any space in between, the driver could not control the piston. It would be a case of the piston moving either forward or backward and only stopping at either the front or the back of the cylinder. With the one-quarter of an inch free movement of the valve plunger, the driver can make the piston stop and stay at any position he desires in its course from one end of the cylinder to the other. He can perfectly control the speed of the piston on its engagement stroke simply by pressing the accelerator lightly or heavily. As the valve plunger port 19 starts to open the back vacuum passage 13, the vacuum draws on the back side of the piston pulling it back toward engaging the clutch, while at the same time, the front valve plunger port 18 is opening the valve passage 10 permitting air to enter, thus destroying the vacuum ahead of the piston and eliminating any back pressure, or lag, on the back or clutch engagement stroke of the piston. The speed of the piston or the speed of the engagement of the clutch depends on just how far the valve plunger is pressed in. The lost motion in the throttle system will be adjusted so that the butterfly valve in the carburetor will start to open just a fraction before the engagement of the clutch.

To operate a car equipped with the automatic clutch, the driver simply must start the engine. The engine can be started with the gear shift lever shifted into any gear without having any effect. However, after starting the engine, if the same is cold and the driver wishes to race it a few times by depressing the accelerator with the intention of warming the same up before starting off then the gear shift lever will have to be in a neutral position. After starting the engine all that the driver must do to put the car in motion is to shift into first gear and press the accelerator and, as the accelerator is depressed the valve plunger moves forward closing the valve passages 12 and 11 and opening passages 13 and 10, the piston moves toward the back of the cylinder, the clutch engages, the engine speeds up and the car is on its way. After gaining sufficient speed the accelerator is released. The engine idles with the releasing of the accelerator. The valve plunger also releases or moves back closing valve passages 10 and 13 and opening valve passages 12 and 11. The piston moves forward and the clutch is disengaged. The gear shift lever is shifted into second gear and the same operation takes place again and the same again until the car is in high gear.

With the car in high gear the rod 27 will be moved to a position where it will engage the notch 25 when the accelerator is depressed after shifting into high gear and thus the accelerator cannot be released beyond the idling speed of the engine. The spring 34 will take care of the movement of the rod assembly until the rod 27 engages the notch on the accelerator. When the gear shift lever is taken out of high gear, the high gear fork will pull the rod assembly with it, the head 29 of the rod 30 moving the rod 27 with the rod 30 and when this happens the accelerator will return to its inoperative position, thereby causing the clutch to disengage. When the speed of the car slackens the governor will push forwardly the rod 38 which will rock the lever 34 which, in turn, moves the rod 27 rearwardly out of engagement with the accelerator, thus permitting the accelerator to release all of the way, thereby causing the clutch to disengage. Thus it will be seen that the purpose of the governor is that after the car is in high gear the governor prevents the clutch from disengaging when the accelerator is released unless the car is slowed up and then the governor automatically disengages the clutch.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a motor vehicle including a clutch pedal, an accelerator and a throttle valve, a cylinder having ports in communication with its ends, a conduit connecting said ports with a suction producing device of the motor, a valve controlling the ports, a piston in the cylinder, a piston rod, a link connecting the rod to the clutch pedal, a link connecting the valve with the accelerator, the link connecting the accelerator with the throttle valve having a slot therein receiving the arm of the throttle valve for causing operation of the suction controlling valve before the operation of the throttle valve, means for holding the accelerator in partly depressed position when the vehicle is in high gear for preventing movement of the accelerator operating the said valve for causing the piston to release the clutch, and governor operating means for moving the accelerator holding means in position when the speed of the vehicle has been reduced to a predetermined degree.

2. In a motor vehicle including an intake manifold, a clutch pedal, an accelerator, a throttle valve, and a high gear fork, a cylinder having ports in communication with its ends and leading to the atmosphere and a pair of passages in communication with the ends of the cylinder, a manifold connecting the passages together, a conduit connecting the manifold to the intake manifold, a slide valve controlling the ports and passages and having a pair of ports therein, each of the last-mentioned ports having a large rear end and the ports tapering from the enlargement to the front end, said valve ports acting to alternately open one passage leading to one end of the cylinder and open the port leading to the opposite end of the cylinder while closing the other passage and the other port, a piston in the cylinder, a rod connected with the piston, a link connecting the rod with the clutch pedal, a link connecting the slide valve with the accelerator, and the link which connects the accelerator with the throttle valve having a slot therein for receiving a part of the throttle valve, a two part rod having its parts slidably connected together, a spring tending to force the two parts away from each other, one part being connected with the high gear fork of the transmission, the other part having a projection thereon, the accelerator having a notch therein for engagement by the projection for holding the accelerator partly depressed, a governor driven by parts of the motor and means operated by the governor to shift the projection carrying part to releasing position when the speed of the vehicle is reduced to a predetermined extent.

3. In a motor vehicle including a clutch and an accelerator, means actuated by difference of pressure for actuating the clutch, means for controlling said means from the accelerator, governor operated means for holding the accelerator in partly depressed position until the speed of the motor vehicle is reduced, and propeller shaft operating means for driving the governor.

HASELL A. LOHSE.